US008608025B2

(12) United States Patent
MacIndoe

(10) Patent No.: US 8,608,025 B2
(45) Date of Patent: Dec. 17, 2013

(54) PNEUMATIC LIQUID DISPENSING APPARATUS AND METHOD

(75) Inventor: William MacIndoe, Exeter, RI (US)

(73) Assignee: Nordson Corporation, Westlake, OH (US)

( * ) Notice: Subject to any disclaimer, the term of this patent is extended or adjusted under 35 U.S.C. 154(b) by 466 days.

(21) Appl. No.: 12/917,978

(22) Filed: Nov. 2, 2010

(65) Prior Publication Data

US 2012/0104033 A1 May 3, 2012

(51) Int. Cl.

*B67B 7/00* (2006.01)
*G01F 11/00* (2006.01)
*B67D 7/60* (2010.01)

(52) U.S. Cl.

USPC ............................................. 222/1; 222/389

(58) Field of Classification Search

USPC .......... 222/1, 55, 61, 389, 394, 571; 137/206, 137/209; 141/115, 126; 239/337, 338, 339, 239/533.1

See application file for complete search history.

(56) References Cited

U.S. PATENT DOCUMENTS 4,989,756 A * 2/1991 Kagamihara et al. ........... 222/55
5,188,258 A 2/1993 Iwashita
5,199,607 A 4/1993 Shimano
5,277,333 A * 1/1994 Shimano ......................... 222/14
5,881,914 A * 3/1999 Tsuda et al. .................... 222/54
2006/0163277 A1* 7/2006 Vidal .............................. 222/55
2010/0025428 A1* 2/2010 Ng et al. ......................... 222/61
2011/0163122 A1* 7/2011 Ueda et al. ...................... 222/61

FOREIGN PATENT DOCUMENTS

CH 698293 B1 7/2009
WO 2010/029748 A1 3/2010

OTHER PUBLICATIONS

European Patent Office, Written Opinion in PCT U.S. Appl. No. PCT/US2011/058724, Oct. 19, 2012.
European Patent Office, International Preliminary Report on Patentability in PCT Application No. PCT/US2011/058724, Jan. 10, 2013.
European Patent Office, International Search Report and Written Opinion in PCT Serial No. PCT/US2011/058724, Feb. 6, 2012.

* cited by examiner

*Primary Examiner* — Paul R Durand
*Assistant Examiner* — Vishal Pancholi
(74) *Attorney, Agent, or Firm* — Wood, Herron & Evans, L.L.P.

(57) ABSTRACT

A dispenser and method for dispensing a liquid. The dispenser includes a barrel with an interior chamber for holding the liquid, a discharge outlet communicating with the interior chamber for discharging the liquid, and an air space for receiving pressurized air for forcing the liquid from the interior chamber through the discharge outlet. An air supply solenoid valve and an air exhaust solenoid valve are each operatively coupled with the barrel. The air supply solenoid valve controls the flow of pressurized air to the air space, and the air exhaust solenoid valve controls the flow of air from the air space to atmosphere. A control selectively activates the air supply solenoid valve and the air exhaust solenoid valve to respectively supply air to the air space and exhaust air from the air space in order to dispense desired amounts of the liquid from the discharge outlet.

25 Claims, 6 Drawing Sheets

PNEUMATIC LIQUID DISPENSING APPARATUS AND METHOD

TECHNICAL FIELD

The present invention generally relates to dispensers for metering and dispensing accurate amounts of liquid, such as liquids used in various medical fields, high technology, manufacturing operations, or in other areas.

BACKGROUND

A wide variety of pneumatic fluid dispensers that dispense adhesives, sealants, lubricants and other fluids and liquids in a wide range of viscosities are well known. Pneumatic fluid dispensers have historically been favored because, in a manual dispenser, they are light and easy to manipulate, as well as relatively inexpensive to manufacture and operate. Further, pneumatic technology has continued to improve, so that pneumatic fluid dispensers continue to be widely used. However, applications requiring faster and more precise fluid dispensing in both manual and automated settings continue to grow rapidly. The requirements and specifications for fluid dispensing applications are ever more rigorous. Many applications require that fluids be dispensed in very precise volumes, at very precise locations and at fast cycle (on/off) rates.

Pneumatic fluid dispensers commonly utilize pressurized or "shop" air commonly found in a manufacturing environment. Using a manually initiated or automatically generated command signal, the pressurized air is typically directed against a piston in a syringe barrel holding a liquid. In other applications, the pressurized air may be directly applied to the liquid. The resulting force urges the liquid from the syringe. Pneumatic dispensers are known to use air flow regulators to control the pressurized air supplied to the barrel. Such regulators act as flow restrictors and extend the time required to fill the air space in the syringe barrel with the requisite air needed to reach a fully pressurized dispensing condition. In addition, vacuum generators on the exhaust side of the dispenser are used for purposes of placing the air space of the syringe barrel under vacuum to prevent dripping. These vacuum generators, which may be venturi devices, act as air flow restrictions on the exhaust side and lengthen the time for venting the syringe barrel when stopping a dispense cycle. The effect is an overall increase in the dispense cycle time that may be achieved, i.e., the time necessary to complete one full "on" to "off" cycle of liquid dispensing. Other aspects of typical dispensers that can increase cycle time include locating the pneumatic controls away from the dispensing syringe and directing the pressurized air through a tube coupled between a control unit and the dispensing syringe. The added air volume and restricting effect represented by the tube results in an increased pressurization time at the beginning of each dispense cycle.

It would be desirable to provide dispensing apparatus and methods that address these and other issues with existing apparatus and methods.

SUMMARY

The invention generally provides a dispenser for dispensing a liquid comprising a barrel including an interior chamber for holding the liquid. The barrel includes a discharge outlet communicating with the interior chamber for discharging the liquid, and an air space for receiving pressurized air for forcing the liquid from the interior chamber through the discharge outlet. The dispenser further includes an air supply solenoid valve and an air exhaust solenoid valve each operatively coupled with the barrel. More specifically, the air supply solenoid valve controls the flow of pressurized air to the air space, and the air exhaust solenoid valve controls the flow of air from the air space to atmosphere. The dispenser further includes a control that selectively activates the air supply solenoid valve and the air exhaust solenoid valve to respectively supply air to the air space and exhaust air from the air space in order to dispense desired amounts of the liquid from the discharge outlet.

In one embodiment, the dispenser includes a barrel adapter coupled to the barrel and including an air inlet passage and an air exhaust passage and includes various pneumatic controls. It will be appreciated that the invention encompasses other embodiments in which the pneumatic controls are located more remote from the barrel. The barrel adapter is directly coupled to the barrel and includes an air passage that opens directly to the air space of the barrel. The air supply solenoid valve is mounted in the barrel adapter and communicates with the air inlet passage for controlling the flow of pressurized air from the air inlet passage to the air space. The air exhaust solenoid valve is mounted in the barrel adapter and communicates with the air exhaust passage for controlling the flow of pressurized air from the air space through the air exhaust passage to atmosphere. Mounting the solenoid valves in the barrel adapter and coupling the barrel adapter to the barrel eliminates tubing and provides for faster cycle times.

A vacuum generator is also provided and is preferably mounted in the barrel adapter. The vacuum generator is in fluid communication with the air exhaust passage and may be of the venturi type. The air is exhausted from the air space through the air exhaust passage and is at least partially directed through the vacuum generator. A check valve is also provided and mounted in the barrel adapter. The check valve is coupled in fluid communication with the air exhaust passage. The air exhausted from the air space is directed through the check valve and through the vacuum generator in this embodiment. The check valve provides for fast venting and, therefore, fast transitioning to the "off" condition of the dispenser. When the syringe barrel is fully vented, the vacuum generator brings the air space of the barrel to a final vacuum condition, which is then retained by isolating the air space from the pneumatic control system, i.e., closing both solenoid valves. The dispenser can also include a pressure transducer positioned in fluid communication with the air space of the barrel and operative to sense an air pressure of the air space. The pressure transducer is electrically connected with the control and supplies a signal to the control based on a pressure reading of the air space in the barrel. Preferably, the pressure reading is an absolute pressure. The control uses the signal for operating at least one of the solenoid valves to place the air space under a desired pressure for dispensing purposes.

The invention also generally provides a method of operating a liquid dispenser including a barrel with an interior chamber holding a liquid and having a discharge outlet communicating with the interior chamber for discharging the liquid and an air space for receiving pressurized air for forcing the liquid from the interior chamber through the discharge outlet. The method comprises supplying pressurized air to an air supply solenoid valve coupled in fluid communication with the air space of the barrel; actuating the air supply solenoid valve to an open position to direct the pressurized air to the air space; actuating the air supply solenoid valve to a closed position to isolate the air space from atmosphere after the air space has been pressurized; discharging the liquid from the interior chamber while the air space is pressurized and isolated from atmosphere; and actuating an air exhaust solenoid valve to an open position to couple the air space to an air exhaust passage while the air supply solenoid valve is in the closed position, thereby decreasing the force on the liquid and stopping the discharge of liquid from the interior chamber.

The method can further include maintaining vacuum in the air exhaust passage until the air space is under vacuum and actuating the air exhaust solenoid valve to a closed position to isolate the air space under vacuum. The use of vacuum in this manner provides a force on the liquid that inhibits dripping from the discharge outlet. The step of actuating the air exhaust solenoid valve can further comprise directing air from the air exhaust passage through a check valve. The method can further include sensing the pressure of the air space and, based at least in part on the sensed pressure, operating at least one of the solenoid valves to place the air space under a desired pressure. In another aspect, the method can include placing the air space under vacuum when the dispensing cycle ends.

In additional embodiments, placing the air space under vacuum may further comprise actuating both the air supply solenoid valve and the air exhaust solenoid valve into closed positions to isolate the air space under a vacuum condition. The exhaust solenoid valve may be actuated to an open position after the air space has been pressurized if, for example, the pressure sensor indicates that the desired set point pressure has been exceeded. In this case the air may be exhausted or vented by the exhaust solenoid valve to lower the pressure to the desired set point. The method can further comprise actuating the air supply solenoid valve to the open position at least one additional time during a dispense cycle to increase the pressure in the air space while discharging the liquid. This can be advantageous during long dispense cycles when the air space pressure falls below a pressure required for proper dispensing.

The method can further comprise taking a plurality of pressure readings of the air space while discharging the liquid. A maximum pressure is determined from the plurality of readings and the maximum pressure is maintained in the air space during a subsequent dispensing cycle with the maximum pressure maintained during the subsequent dispense cycle being substantially equal to the maximum pressure determined from the plurality of readings. The plurality of readings may also be added together to determine a Pressure Impulse. The Pressure Impulse is maintained during a subsequent dispense cycle to be substantially equal to the Pressure Impulse determined from the plurality of readings. The step of maintaining the maximum pressure can include adjusting the time that the air supply solenoid valve is in the open position. The step of maintaining the Pressure Impulse can include adjusting a dwell time in which both the air supply solenoid valve and the exhaust solenoid valve are in the closed position.

The method can further comprise the steps of sensing a level of vacuum and generating a signal, and in response to the signal, performing one of the following: actuating the air supply solenoid valve to an open position, or actuating the exhaust solenoid valve to an open position. In the method, the air supply solenoid valve is in the open position for a time T1, the air supply solenoid valve and the air exhaust solenoid valve are in the closed position for a time T2, and the air exhaust solenoid valve is in the open position for a time T3. The method further comprises the steps of: at the end of time T3 actuating the air exhaust solenoid valve to a closed position and sensing air pressures of the air space during T1, T2, and T3. The method then includes determining whether the sensed pressure is within a proper range and performing one of the following: adjusting the time T3 for the next dispensing cycle, or determining the maximum air pressure from the sensed air pressures and adding the sensed air pressures together to determine a Pressure Impulse.

Various additional features and advantages will become apparent upon review of the following detailed description of the illustrative embodiments taken in conjunction with the accompanying drawings.

DETAILED DESCRIPTION

Figure 1:
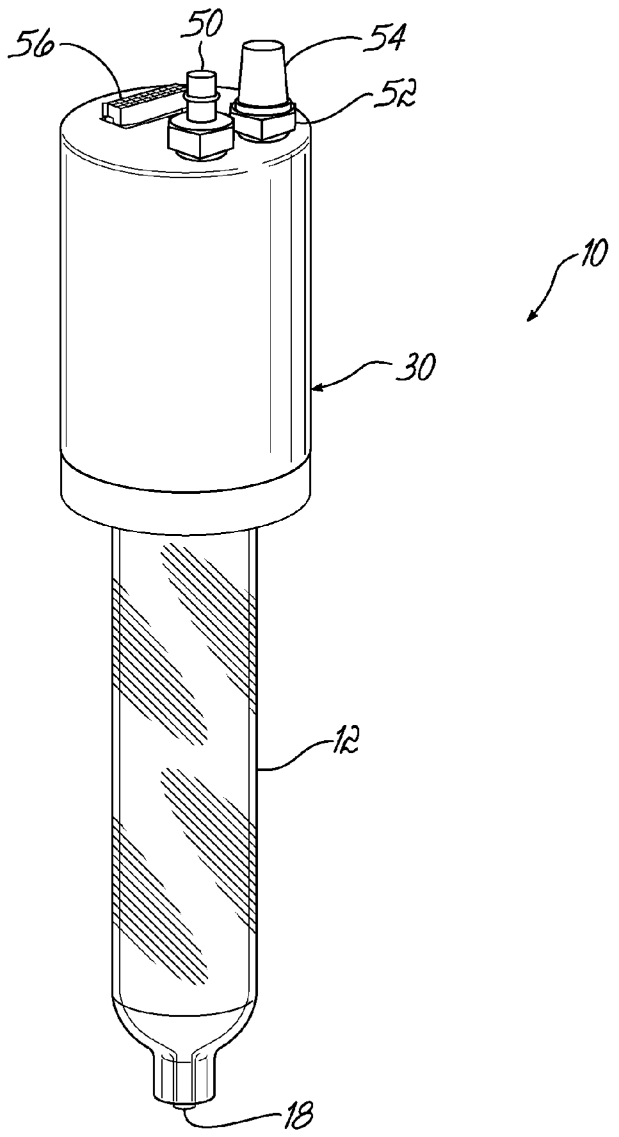
FIG. 1 is a perspective view of a dispenser constructed in accordance with an illustrative embodiment of the invention.
Figure 2:
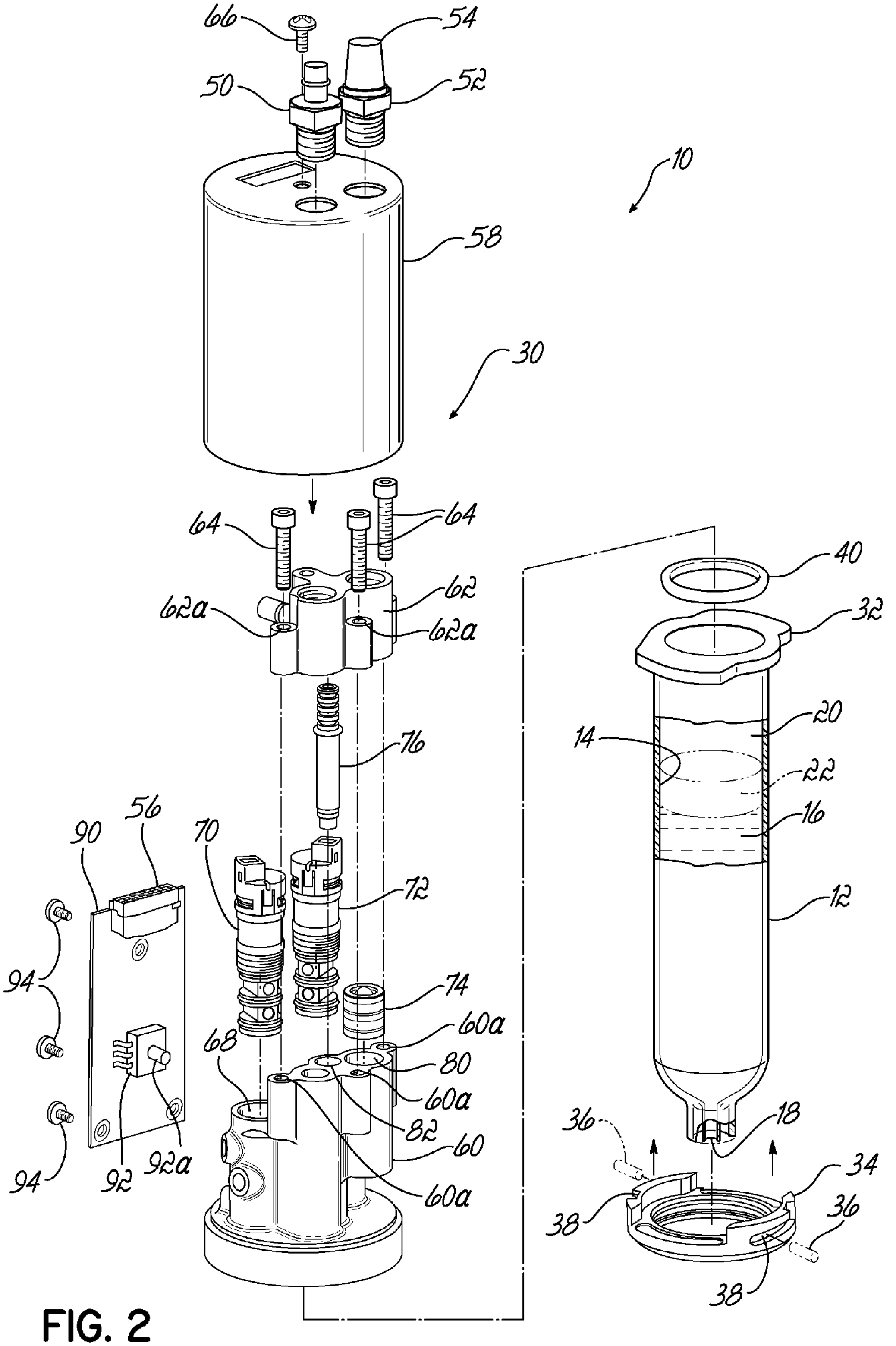
FIG. 2 is an exploded perspective of the dispenser illustrated in FIG. 1.

FIGS. 1 and 2 respectively illustrate assembled and disassembled views of a dispenser 10 constructed in accordance with an illustrative embodiment of the invention. Generally, the dispenser 10 comprises a syringe or cartridge barrel 12 including an interior chamber 14 for holding a liquid 16 and further including a discharge outlet 18 communicating with the interior chamber 14 for discharging the liquid 16. A nozzle or needle (not shown) may be coupled to the outlet 18. An air space 20 is provided at the upper end of the barrel 12 for receiving pressurized air to force the liquid 16 from the interior chamber 14 through the discharge outlet 18. The interior chamber 14 may or may not contain a piston 22. In cases in which a piston 22 is not used, the pressurized air will be applied directly against the liquid 16 in the chamber 14. In cases in which a piston 22 is used, the pressurized air is applied against an upper side of the piston 22 and the piston 22 will act directly against the liquid 16 for forcing the liquid 16 from the interior chamber 14 through the discharge outlet 18. A barrel adapter 30 is coupled to the barrel 12 by way of a flange 32 attached to the top of the barrel 12. This flange 32 is received in a space defined on a twist-lock clamp element 34 receiving the barrel 12. This twist-lock clamp element 34 then receives a pair of stationary pins 36 rigidly affixed in the bottom of the barrel adapter 30. The pins 36 are received in respective slots 38 (one fully shown) and then the assembly 12, 34 is secured by twisting the barrel 12 onto the pins 36 retained in the slots 38. An O-ring 40 is provided between the flange 32 of the barrel 12 and the bottom of the barrel adapter 30 for providing an airtight seal. As further shown in FIG. 1, the barrel adapter 30 generally includes a pressurized air inlet 50, an exhaust fitting 52 with an optional muffler 54, and an electrical connector 56 extending through a cover 58.

As more specifically shown in FIG. 2, the barrel adapter 30 further comprises a main body 60 and a cap 62 secured together by a plurality of fasteners 64 extending through holes 62*a* and into threaded holes 60*a*. The cover 58 is secured to the cap by a fastener 66. The main body 60 and the cap 62 include passages for controlling pressurized air. These passages are more specifically shown in the schematic figures of FIGS. 3A-3C to be described. Generally, the main body 60 includes passages 68 (one shown) for receiving cartridge style air supply solenoid valve 70 and an identical cartridge style air exhaust solenoid valve 72. A check valve 74 and a vacuum generator 76 are likewise mounted in respective passages 80, 82. The solenoid valves 70, 72 are "2-2" valves having two positions, one allowing air flow therethrough and one preventing air flow therethrough. Thus, each solenoid valve 70, 72 may be actuated between an open position allowing air flow and a closed position preventing air flow. The energized condition of each solenoid valve 70, 72 corresponds to the open position, whereas the deenergized condition corresponds to the closed position of each solenoid valve 70, 72. It will be appreciated that various types of solenoid valves may be used to carry out the principles disclosed herein. The exhaust fitting 52 in the cap 62 is in fluid communication with the exhaust muffler 54 and also in fluid communication with the check valve 74 and exhaust passage 80 in the main body 60. The solenoid valves 70, 72, check valve 74 and the vacuum generator 76 are in controlled fluid communication with additional passages associated with the pneumatic control of the barrel adapter 30 as will become more apparent in the description of FIGS. 3A-3C below. The barrel adapter 30 further comprises a control board 90 including a pressure transducer 92 which, preferably, is of the absolute type. The pressure transducer 92 includes a sensing element 92*a* that extends into a passage (not shown) of the main body 60 communicating with the air space 20 of the barrel 12, as will be described below. The control board 90 is fastened to the main body 60 and cap 62 by fasteners 94.

Figure 3A:
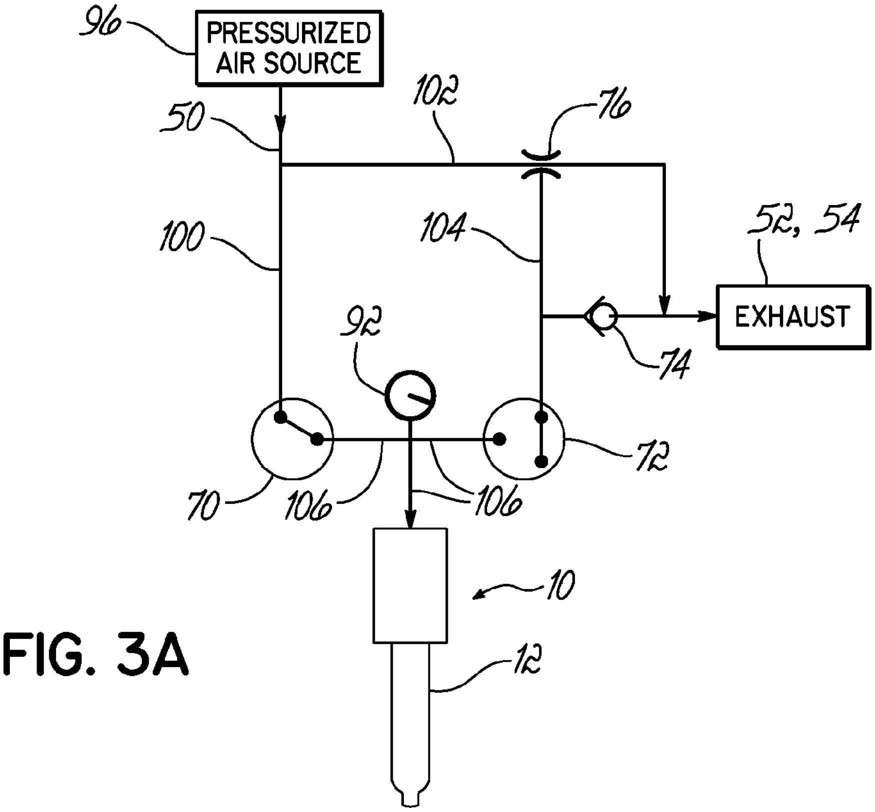
FIG. 3A is a schematic illustration of the pneumatic control system of the dispenser illustrated in FIG. 1, and showing an air fill or pressurizing portion of the dispense cycle.
Figure 3B:
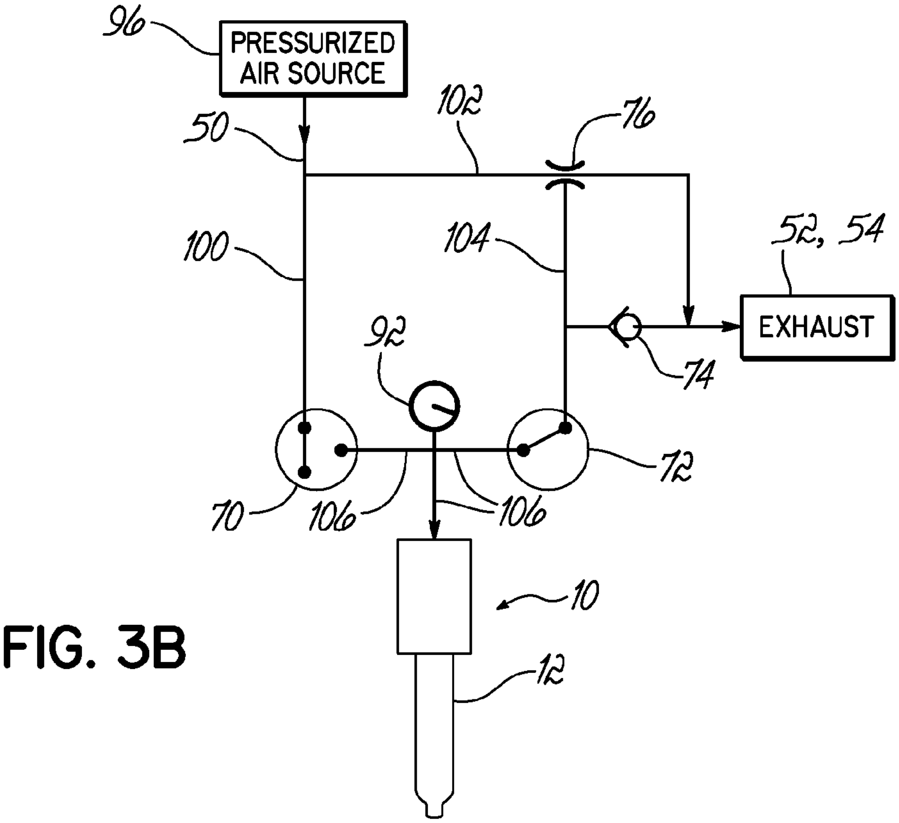
FIG. 3B is a schematic illustration of the pneumatic control system of the dispenser illustrated in FIG. 1, and showing an exhaust or venting portion of the cycle.
Figure 3C:
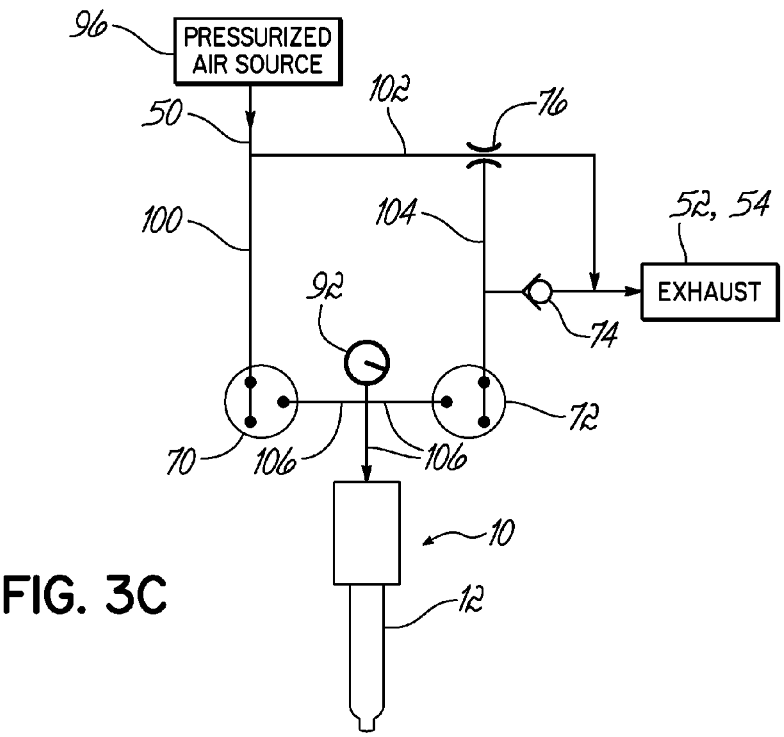
FIG. 3C is a schematic illustration of the pneumatic control system of the dispenser illustrated in FIG. 1, and showing a liquid dispensing portion of the cycle.

FIGS. 3A, 3B and 3C schematically illustrate the pneumatic control system and passages associated with the barrel adapter 30. As shown in FIG. 3A, pressurized air 96 is supplied to the air inlet 50 and is directed into respective passages 100, 102 that supply pressurized air to the air supply solenoid valve 70 and the vacuum generator 76. The air may be supplied at conventional shop air pressure, such as 100 psi. The pressurized air that is directed through the venturi-type vacuum generator 76 creates vacuum in an exhaust passage 104 for purposes to be described below. The exhaust passage 104 is in fluid communication with the inlet side of the check valve 74. The outlet of the check valve 74 and the outlet of the vacuum generator 76 both communicate with the exhaust port 52 and muffler 54 previously described. The air exhaust solenoid valve 72 is coupled for fluid communication between the exhaust passage 104 and a passage 106 in the barrel adapter 30 fluidly coupled with the air space 20. The pressure transducer 92 and, more specifically, the sensing element 92*a* is in fluid communication with the same passage 106 leading to the air space 20 of the syringe barrel 12.

FIG. 3A specifically shows the condition of the pneumatic control system of the barrel adapter 30 in which the air space 20 of the syringe barrel 12 is being filled or charged with pressurized air. The air supply solenoid valve 70 has been energized to an open position allowing fluid communication between the air inlet port 50 and the air space 20 of the syringe barrel 12. The air exhaust solenoid valve 72 has been deenergized and placed into a closed position preventing air flow from the air space 20 into the exhaust passage 104. The pressure transducer 92 reads the absolute pressure of the air space 20.

With both solenoid valves 70, 72 in their closed position, as shown in FIG. 3C, the air space 20 is isolated from the pneumatic controls and the positive pressure in the air space 20 is retained. At this time, the pressurized air in the air space 20 is acting against the liquid, or optionally against a piston 22, in order to force the liquid from the interior chamber 14 through the discharge outlet 18. The dispensing will actually begin prior to the closing of the air supply solenoid valve 70, as the pressure in the air space 20 exceeds a threshold value. As shown in FIG. 3B, the air exhaust solenoid valve 72 is energized or otherwise actuated to an open position which allows the air pressure in the air space 20 to be vented. This may be required, for example, if the air fill operation resulted in an overshoot of the desired application pressure in the air space 20. In this case, the air exhaust solenoid valve 72 may be opened briefly, one or more times, in order to vent the pressure until the pressure transducer 92 indicates that the proper air pressure has been reached. At that time, the air exhaust solenoid valve 72 is actuated to a closed position (i.e., deenergized) to isolate the air space 20 and retain the desired air pressure for the liquid dispense cycle. To end the dispense cycle, the air exhaust solenoid valve 72 is opened to vent the air pressure in the air space 20 fully and reduce the force on the liquid 16 to such a point that the liquid stops discharging from the outlet 18. More specifically, the air space 20 of the barrel 12 is coupled for fluid communication to the vacuum portion of the pneumatic control system, i.e., passage 104. This causes the pressure in the air space 20 of the barrel 12 to drop and the pressure in the vacuum portion (i.e., passage 104) to increase above atmospheric pressure. This, in turn, causes the check valve 74 to open, connecting the vacuum portion of the system to atmosphere. This allows the barrel pressure to more quickly reach atmospheric pressure. The vacuum generator 76 continues to operate, due to the flow of inlet air at 50, to bring the vacuum portion of the system back to the maximum vacuum condition. The air exhaust solenoid valve 72 remains open for a time sufficient to establish the desired final vacuum level in the air space 20. The air exhaust solenoid valve 72 is then actuated to a closed position to isolate the air space 20 in the barrel 12 under the established vacuum condition. This provides a force on the liquid 16 tending to withdraw the liquid 16 away from the discharge outlet 18 to prevent dripping. The pressure transducer 92 may then be used to actively monitor the vacuum pressure in the air space 20 and, as necessary to maintain the desired vacuum level, open and closed the solenoid valve 72 to adjust the vacuum level.

Figure 4:
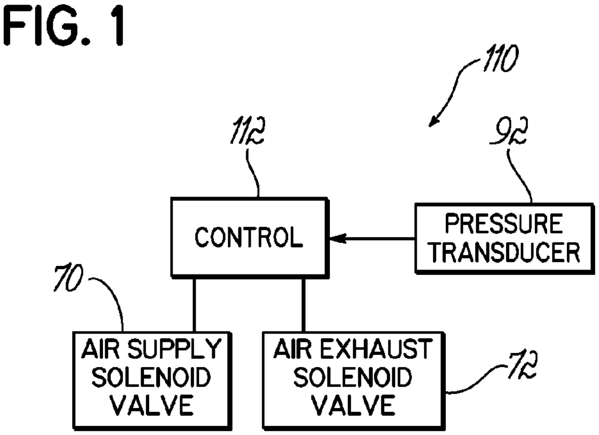
FIG. 4 is an electrical control schematic of the dispenser illustrated in FIG. 1.
Figure 4A:
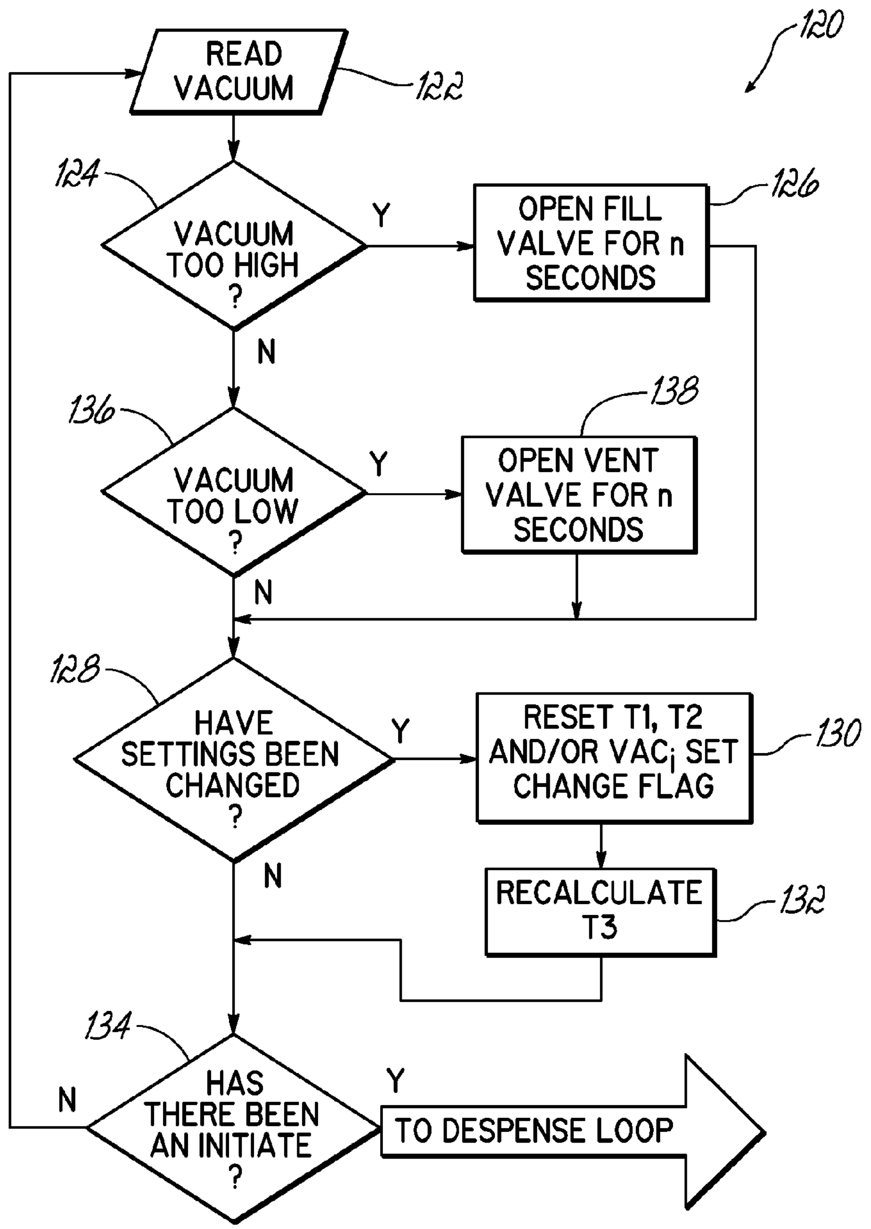
FIGS. 4A and 4B are flow diagrams that illustrate processes implemented by software of the control.
Figure 4B:
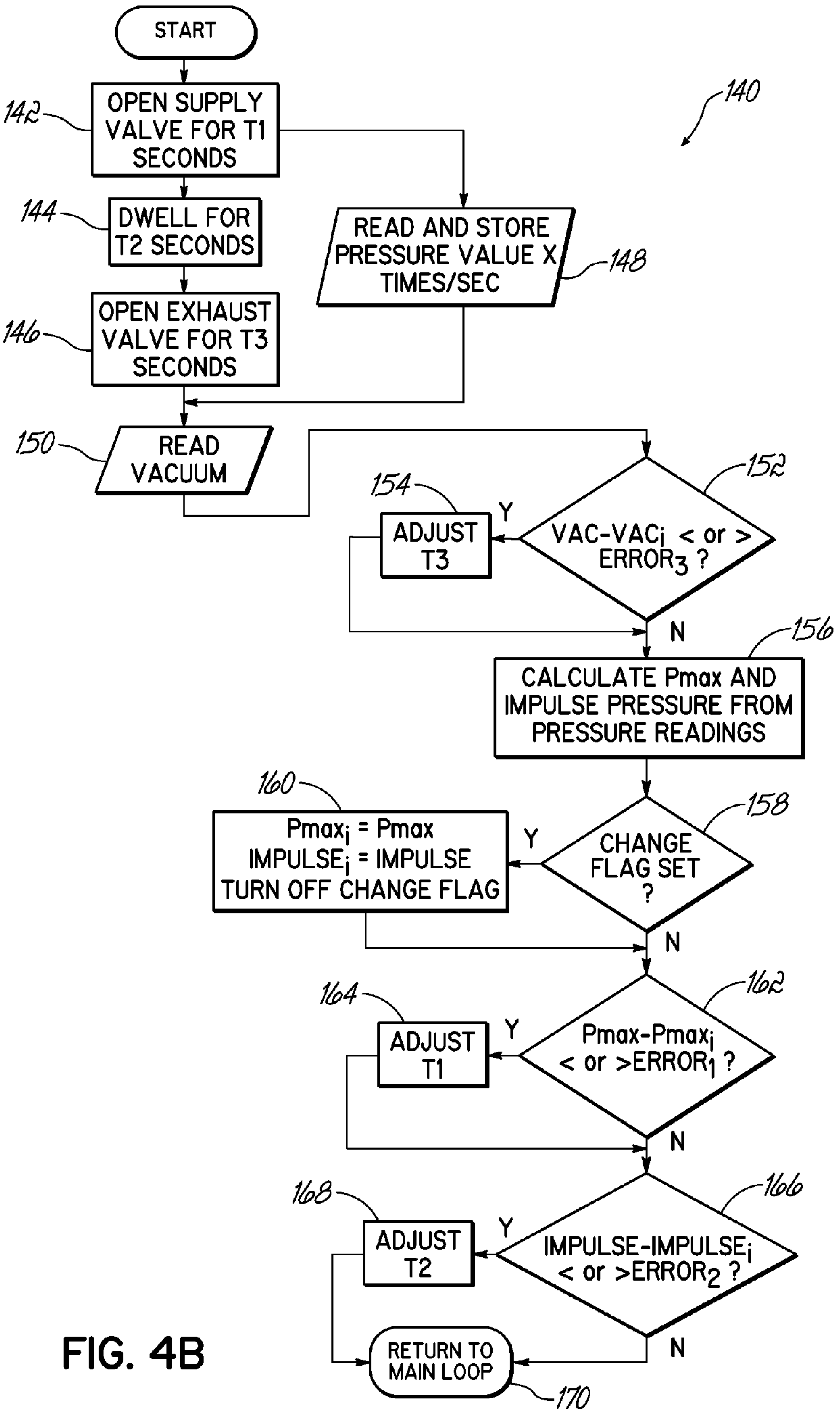

FIG. 4 illustrates an electrical control system 110, which may be operated under a standard PID control scheme. In this regard, the pressure transducer 92 and the solenoid valves 70, 72 are each in electrical communication with a central control 112, such as a digital signal processor on the board 90 or in a remote location. FIGS. 4A and 4B illustrate respective control flow diagrams for implementing software associated with the central control 112. In general, the control uses the pressure transducer 92 to gather pressure readings throughout a dispensing cycle. Two pieces of information are used from these air pressure readings, the maximum air pressure reached (Pmax), and the sum or aggregate of all pressure readings (Pressure Impulse). These two outputs or readings during each dispense cycle are used as process variables measured for statistical process control purposes. A fixed number or "window" of these process outputs are evaluated to determine the trend of the outputs. The process inputs are adjusted, as needed, to maintain Pmax and Pressure Impulse constant. The two process inputs are the "on" time of the air supply solenoid valve 70 and the "dwell" time, which is the time during which both solenoid valves 70, 72 are closed and dispensing continues to occur. As the syringe barrel 12 empties during a dispense cycle, the "on" time of the air supply solenoid valve 70 is adjusted to maintain the maximum air pressure or Pmax constant and the "dwell" time is adjusted to keep the Pressure Impulse (i.e., the sum of all pressure readings during the window), constant. This effectively adjusts for a full-to-empty effect that would otherwise occur causing undesirable variation in the dispensed volume.

More specifically referring to FIG. 4A, a main loop 120 illustrating the function or operation of the software is shown and runs at any time that the control system is activated and a dispense cycle is not being run. In this main loop 120, a vacuum reading is taken at 122 by the pressure transducer or sensor 92 (FIGS. 3A-3C) to read the level of vacuum or negative pressure in the air space 20. A query is made at 124 to determine if the vacuum level is too high. If the vacuum level is too high, the process moves to step 126 and the air supply solenoid valve 70 is opened for n seconds. The number of seconds (n), or fraction thereof, that the air supply solenoid valve 70 is opened is predetermined and may, for example, be of very short time duration for purposes of slightly reducing the vacuum by adding a small amount of positive pressure to the air space 20. The process then moves to another query at 128 to determine whether the settings or process inputs have been changed. These settings include the air fill time T1, the dwell time T2 (i.e., the time that valves 70, 72 are closed) and the vacuum setting or $VAC_i$. If any of these settings have been changed then the affected inputs are reset and a change flag is set at 130. T3, or the exhaust solenoid valve on time is then recalculated based on the inputs at 132. The process then moves to another query at step 134 asking whether a dispense cycle has been initiated by the user. If a dispense cycle has not been initiated, the control reverts to the initial step 122 of reading the vacuum and determining whether the vacuum level is too high or too low and opening the appropriate solenoid valve 70 or 72 to adjust the vacuum level. If the vacuum level is not too high then the process moves to step 136. If the vacuum level is determined to be too low at 136, then the vent or exhaust valve 72 is opened for n seconds at 138, again predetermined similar to the corresponding step 126 implemented for the high vacuum situation. If the vacuum level is neither too high nor too low, then the process moves to step 128 as described. If a dispense cycle has been initiated by the user, the control software runs the process illustrated in FIG. 4B.

Upon initiation or start of the dispense cycle illustrated in the dispense loop 140 of FIG. 4B, the air supply solenoid valve 70 is opened for T1 seconds at step 142. At the end of T1 seconds, the air supply solenoid valve 70 is closed and, at 144, the control implements a dwell time for T2 seconds during which each valve 70, 72 is closed and dispensing occurs. At the end of T2 seconds, at 146, the control opens the exhaust solenoid valve 72 for T3 seconds. During this time (T1+T2+T3), at 148, pressure readings are made by the pressure transducer 92 and stored by the control 112 (FIG. 4). These pressure readings (for example, 1000 pressure readings per second) are subsequently used to calculate Pmax and Pressure Impulse. After the exhaust solenoid valve 70 has been closed, the pressure transducer 92 reads the vacuum level at step 150. A query is made at 152 to determine whether the vacuum level is within the proper range, that is, whether the detected vacuum level VAC minus the initial or desired target vacuum level $VAC_i$ is either too high or too low. If it is too high or too low then T3 is adjusted higher or lower at step 154 to adjust the vacuum level in the appropriate direction based on whether the detected vacuum level was too high or too low. If the detected vacuum level is within an acceptable range then, at step 156, Pmax and Pressure Impulse are calculated from the pressure readings taken in step 148. At step 158 the control determines whether the change flag has been set. If so, the target maximum pressure value $Pmax_i$ is set to equal Pmax and the target aggregate pressure valve Pressure $Impulse_i$ is set to equal Pressure Impulse, and the change flag is turned off at 160. If the change flag is not set at step 158, then a query is made at 162 as to whether Pmax minus $Pmax_i$ is less than or greater than an acceptable error value range. If it is less than or greater than an acceptable error value range, then T1 is adjusted at step 164. If Pmax minus $Pmax_i$ is within the acceptable error value range, then the software implements the next query at step 166 to determine whether the Pressure Impulse value minus Pressure $Impulse_i$ is less than or greater than an acceptable error value range. If it is less than or greater than an acceptable error value, then T2 is adjusted in the appropriate direction at 168. If it is not less than or greater than an acceptable error value range, then the control returns to the main loop at 170. A moving window of readings taken at step 148 over the course of a number prior dispense cycles is used for purposes of determining $Pmax_i$ and Pressure $Impulse_i$. It will be appreciated, that this control maintains the appropriate level of vacuum when the system is not dispensing any liquid, so that dripping is prevented, and effectively adjusts for the full-to-empty effect by maintaining the maximum air pressure Pmax constant, as well as the Pressure Impulse or the sum of all pressure readings made during a specific time window, constant from dispense cycle to dispense cycle.

Figure 5:
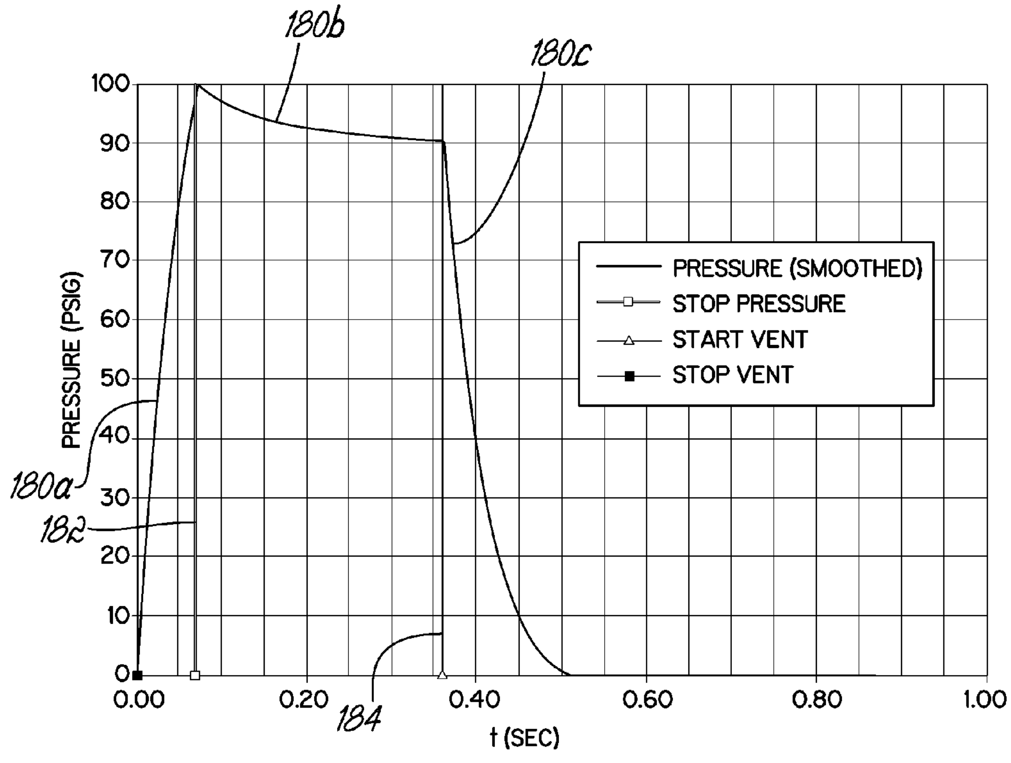
FIG. 5 is a graph illustrating the dispense cycle of the dispenser illustrated in FIG. 1.

FIG. 5 graphically illustrates one dispense cycle plotting air pressure versus time. The pressure is shown to increase along a line 180*a* from time "t" equal to 0 until the pressure reaches 100 psig or any other suitable operating pressure. At this time, indicated by a vertical line 182 the syringe barrel is isolated as shown in FIG. 3C and the liquid dispense cycle continues with liquid dispensing from the discharge outlet 18 until the exhaust solenoid valve 72 is opened as shown at the vertical line 184. The air pressure during this second portion of the cycle typically decreases due to thermodynamic effects by approximately 10% as indicated by line 180*b*. This effect could be offset by active, closed-loop control of barrel pressure, using the pressure transducer and air supply solenoid valve. The exhaust solenoid valve 72 is then opened as shown at the vertical line 184. Venting rapidly occurs such that the pressure drops quickly as indicated by line 180*c* and, ultimately, a vacuum condition is reached as previously discussed. The air space 20 is then isolated under vacuum. As the graph illustrates, the fill and vent portions of the full on/off cycle are rapid, and this results in the ability to more rapidly cycle the dispenser between on and off conditions and more accurately dispense liquid, especially in small amounts, during each liquid dispense cycle.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. An apparatus for controlling the dispensing of a liquid from a barrel including an interior chamber for holding the liquid, a discharge outlet communicating with the interior chamber for discharging the liquid, and an air space for receiving pressurized air for forcing the liquid from the interior chamber through the discharge outlet, the apparatus comprising:

an air supply solenoid valve and an air exhaust solenoid valve adapted to be operatively coupled with the barrel, the air supply solenoid valve operative to control the flow of pressurized air to the air space, and the air exhaust solenoid valve operative to control the flow of air from the air space to atmosphere; and a control that selectively activates the air supply solenoid valve and the air exhaust solenoid valve to (i) move the air supply solenoid valve to an open position to supply pressurized air to the air space, (ii) move the air supply solenoid valve to a closed position while maintaining the air exhaust solenoid valve in a closed position to isolate the air space from atmosphere after the air space is pressurized in order to dispense desired amounts of the liquid from the discharge outlet, and (iii) move the air exhaust solenoid valve to an open position to decrease pressurization in the air space and thereby stop liquid dispensing.

2. The apparatus of claim 1, further comprising:

a barrel adapter adapted to be coupled to the barrel and including an air inlet passage and an air exhaust passage, the air supply solenoid valve mounted in the barrel adapter and communicating with the air inlet passage for controlling the flow of pressurized air from the air inlet passage to the air space, and the air exhaust solenoid valve mounted in the barrel adapter and communicating with the air exhaust passage for controlling the flow of pressurized air from the air space through the air exhaust passage to atmosphere.

3. An apparatus for controlling the dispensing of a liquid from a barrel including an interior chamber for holding the liquid, a discharge outlet communicating with the interior chamber for discharging the liquid, and an air space for receiving pressurized air for forcing the liquid from the interior chamber through the discharge outlet, the apparatus comprising:

an air supply solenoid valve and an air exhaust solenoid valve adapted to be operatively coupled with the barrel, the air supply solenoid valve operative to control the flow of pressurized air to the air space, and the air exhaust solenoid valve operative to control the flow of air from the air space to atmosphere;

a control operative to selectively activate the air supply solenoid valve and the air exhaust solenoid valve to respectively supply air to the air space and exhaust air from the air space in order to dispense desired amounts of the liquid from the discharge outlet;

a barrel adapter adapted to be coupled to the barrel and including an air inlet passage and an air exhaust passage, the air supply solenoid valve mounted in the barrel adapter and communicating with the air inlet passage for controlling the flow of pressurized air from the air inlet passage to the air space, and the air exhaust solenoid valve mounted in the barrel adapter and communicating with the air exhaust passage for controlling the flow of pressurized air from the air space through the air exhaust passage to atmosphere; and a vacuum generator mounted in the barrel adapter and in fluid communication with the air exhaust passage, wherein the air exhausted from the air space through the air exhaust passage is at least partially directed through the vacuum generator.

4. The apparatus of claim 3, further comprising:

a check valve mounted in the barrel adapter and in fluid communication with the air exhaust passage and the vacuum generator, wherein the air exhausted from the air space through the air exhaust passage is directed through the vacuum generator and also through the check valve.

5. The apparatus of claim 1, further comprising:

a check valve in fluid communication with the air exhaust solenoid valve, wherein the air exhausted from the air space is directed through the check valve.

6. The apparatus of claim 1, further comprising:

a pressure transducer positioned in fluid communication with the air space and operative to sense an air pressure of the air space, the pressure transducer further being electrically connected with the control and operative to supply a signal to the control, and the control is further operative to use the signal for operating at least one of the solenoid valves to place the air space under a desired pressure.

7. A dispenser comprising the apparatus and barrel of claim 1.

8. The dispenser of claim 7, further comprising:

a barrel adapter coupled to the barrel and including an air inlet passage and an air exhaust passage, the air supply solenoid valve mounted in the barrel adapter and communicating with the air inlet passage for controlling the flow of pressurized air from the air inlet passage to the air space, and the air exhaust solenoid valve mounted in the barrel adapter and communicating with the air exhaust passage for controlling the flow of pressurized air from the air space through the air exhaust passage to atmosphere.

9. The dispenser of claim 8, wherein a check valve and a pressure transducer are mounted in the barrel adapter.

10. The dispenser of claim 9, further comprising:

a vacuum generator mounted in the barrel adapter and in fluid communication with the air exhaust passage, wherein the air exhausted from the air space through the air exhaust passage is directed through the vacuum generator.

11. A method of operating a liquid dispenser including a barrel with an interior chamber holding a liquid and having a discharge outlet communicating with the interior chamber for discharging the liquid and an air space for receiving pressurized air for forcing the liquid from the interior chamber through the discharge outlet, the method comprising:

supplying pressurized air to an air supply solenoid valve coupled in fluid communication with the air space of the barrel;

actuating the air supply solenoid valve to an open position to direct the pressurized air to the air space;

actuating the air supply solenoid valve to a closed position to isolate the air space from atmosphere after the air space has been pressurized;

discharging the liquid from the interior chamber while the air space is pressurized and isolated from atmosphere; and actuating an air exhaust solenoid valve to an open position to couple the air space to an air exhaust passage while the air supply solenoid valve is in the closed position, thereby decreasing the force on the liquid and stopping the discharge of liquid from the interior chamber.

12. The method of claim 11, further comprising:

maintaining vacuum in the air exhaust passage until the air space is under vacuum; and actuating the air exhaust solenoid valve to a closed position to isolate the air space under vacuum.

13. The method of claim 12, wherein the step of actuating the air exhaust solenoid valve further comprises:

directing air from the air exhaust passage through a check valve.

14. The method of claim 11, wherein the step of actuating the air exhaust solenoid valve further comprises:

directing air from the air space through an air exhaust passage coupled in fluid communication with a check valve; and opening the check valve with the pressurized air from the air space.

15. The method of claim 11, wherein the dispenser further comprises a pressure transducer positioned in fluid communication with the air space and operative to sense an air pressure of the air space, the method further comprising:

sensing the pressure of the air space and, based at least in part on the sensed pressure, operating at least one of the solenoid valves to place the air space under a desired pressure.

16. The method of claim 11, further comprising:

placing the air space under vacuum while the discharge of liquid is stopped to thereby prevent dripping from the discharge outlet.

17. The method of claim 16, wherein placing the air space under vacuum further comprises:

actuating both the air supply solenoid valve and the air exhaust solenoid into closed positions to isolate the air space under a vacuum condition.

18. The method of claim 11, further comprising:

actuating the exhaust solenoid valve after the air space has been pressurized to thereby lower the pressure to a desired set point.

19. The method of claim 11, further comprising:

actuating the air supply solenoid valve to the open position at least one additional time during a dispense cycle to increase the pressure in the air space while discharging the liquid.

20. The method of claim 11, further comprising:

taking a plurality of pressure readings of the air space while discharging the liquid;

determining a maximum pressure from the plurality of readings; and maintaining the maximum pressure in the air space during a subsequent dispense cycle substantially equal to the maximum pressure determined from the plurality of readings.

21. The method of claim 11, further comprising:

taking a plurality of pressure readings of the air space while discharging the liquid;

adding the plurality of readings together to determine a Pressure Impulse; and maintaining the Pressure Impulse in the air space during a subsequent dispense cycle substantially equal to the Pressure Impulse determined from the plurality of readings.

22. The method of claim 20 wherein the step of maintaining the maximum pressure includes adjusting the time that the air supply solenoid valve is in the open position to direct the pressurized air to the air space.

23. The method of claim 21 wherein the step of maintaining the Pressure Impulse includes adjusting a dwell time wherein both the air supply solenoid valve and the exhaust solenoid valve are in the closed position.

24. The method of claim 11 comprising the steps of:

a) sensing a level of vacuum and generating a signal;

b) in response to the signal performing one of the following:

(i) actuating the air supply solenoid valve to an open position; or (ii) actuating the exhaust solenoid valve to an open position.

25. The method of claim 11 wherein the air supply solenoid valve is in the open position for a time T1;

the air supply solenoid valve and the air exhaust solenoid valve are in the closed position for a time T2;

the air exhaust solenoid valve is in the open position for a time T3 and further comprising the steps of:

at the end of time T3 actuating the air exhaust solenoid valve to a closed position and;

sensing air pressures of the air space during T1, T2, and T3;

determining whether the sensed pressure is within a proper range, and performing one of the following:

a) adjusting the time T3 for the next dispensing cycle; or b) determining a maximum air pressure from the sensed air pressures and adding the sensed air pressures together to determine a Pressure Impulse.

* * * * *